(12) United States Patent
Pilcher

(10) Patent No.: US 6,526,700 B1
(45) Date of Patent: Mar. 4, 2003

(54) HIGH PRESSURE DOWNSPOUT

(76) Inventor: Joseph Pilcher, 1616 Park Pl., Wichita, KS (US) 67203

( * ) Notice: Subject to any disclaimer, the term of this patent is extended or adjusted under 35 U.S.C. 154(b) by 0 days.

(21) Appl. No.: 09/877,520

(22) Filed: Jun. 8, 2001

Related U.S. Application Data

(60) Provisional application No. 60/210,591, filed on Jun. 8, 2000.

(51) Int. Cl.$^7$ ................................................ E04D 13/08
(52) U.S. Cl. ................................. 52/16; 52/11; 239/208; 239/282; 239/454; 239/533.13; 137/357; 137/397
(58) Field of Search ........................ 52/11, 16; 239/208, 239/282, 569, 570, 571, 583, 452, 454, 456, 533.13; 137/357, 397, 426

(56) References Cited

U.S. PATENT DOCUMENTS

| | | | | |
|---|---|---|---|---|
| 2,814,529 A | * | 11/1957 | Arnt | 239/208 |
| 2,865,674 A | * | 12/1958 | Jelmeland | 239/208 |
| 3,035,779 A | * | 5/1962 | Convis | 239/208 |
| 3,904,121 A | * | 9/1975 | Geagan | 239/208 |
| 4,171,709 A | * | 10/1979 | Loftin | 137/128 |
| 4,291,836 A | * | 9/1981 | Chen-Hsiung | 239/37 |
| 4,428,394 A | * | 1/1984 | Wright | 137/122 |
| 4,602,460 A | * | 7/1986 | Langenbach | 52/1 |
| 5,220,755 A | | 6/1993 | Roles | |
| 5,607,107 A | | 3/1997 | Grieve et al. | |
| 6,357,183 B1 | * | 3/2002 | Smith | 52/15 |

FOREIGN PATENT DOCUMENTS

DE          3819962 A    *  11/1988    ..................... 52/16

* cited by examiner

*Primary Examiner*—Carl D. Friedman
*Assistant Examiner*—Brian E. Glessner
(74) *Attorney, Agent, or Firm*—Robert Blinn

(57) ABSTRACT

The present invention is a rain water downspout for shooting water away from a building. It includes a vertical downspout column for receiving and holding rainwater. The downspout column has an outlet at its lower end. A buoyant column inside the downspout column rests on the bottom of the downspout column and blocks the downspout column outlet until the downspout column fills with enough water to cause the buoyant column to float. A nozzle is attached to the downspout outlet. The nozzle can be oriented to shoot a stream of water away from the building. When the buoyant column inside the downspout rises, water flows out of the downspout column under pressure and shoots out from the nozzle away from the building.

12 Claims, 2 Drawing Sheets

HIGH PRESSURE DOWNSPOUT

CROSS REFERENCE TO A RELATED APPLICATION

This application claims the benefit of U.S. Provisional Patent Application No. 60/210,591 filed Jun. 8, 2000.

FIELD OF THE INVENTION

This invention relates to a system for projecting a flow of rain water away from a building.

BACKGROUND OF THE INVENTION

Buildings often include an eaves trough system to collect rain water from the roof and direct the water down a plurality of downspouts. The downspouts are normally located along the walls of a dwelling and have downspout elbows at their bases. The downspout elbows at the lower end of downspouts are meant to direct water away from the foundation of the building.

The primary purpose of an eaves trough system is to protect the perimeter foundation of the building from water damage. Therefore, it is important that the water drained from the roof of the building be directed to a location that is a sufficient distance from the base of the foundation.

Various forms of horizontal extensions for conveying rain water away from a building foundation are available. These extensions generally consist of a pipe or a large plastic column that is attached to and stretched out from the downspout. These systems are low pressure systems or gravity systems, whereby no substantial pressure head is generated in the system. They are merely used to distribute water in a small area immediately surrounding the extension portion.

Examples to these low pressure systems are shown in U.S. Pat. Nos. 2,814,529 and 3,966,121. These devices disclose low pressure downspout extensions with a plurality of holes located in the tubing to permit water to be distributed in the immediate area.

A downspout distributor is described in U.S. Pat. No. 3,904,121. This distributor is designed to minimize the discharge water pressure and distribute the water in a manner which eliminates water erosion in the lawn near the outlet of a downspout. This system uses small apertures located on the downspout to spray the immediate surrounding area. In addition, this system uses hose coupling openings at the sides of the downspout elbow. These are used to attach soaker hoses for light distribution of the rain water. This type of system is unsatisfactory because it is designed to work at slight pressure.

These prior art systems are all based on low pressure distribution of rain water run-off from a roof of a dwelling or similar structure. These prior art systems would not be capable of shooting rain water any significant distance from a building.

A high pressure discharging system is described by Roles in U.S. Pat. No. 5,220,775. Roles discloses a vertical downspout having a small diameter discharge outlet at its lower end. The downspout accumulates a head of water so that the water that is discharged from a downspout outlet is discharged at a high pressure. In the Roles system the downspout outlet is small in diameter so that water can accumulate in the down spout to create hydrostatic pressure.

None of these prior art systems provide a system that will consistently discharge water at a high pressure so that water can be projected over a significant distance. Further, none of these prior art systems provide a system that will consistently discharge water at a high pressure and that will clear debris from the system. The invention downspout provides a means for projecting water away from a building by a significant distance. The invention downspout system operates intermittently. When the invention downspout system is discharging water, water is discharged at a high velocity and can be projected a significant distance away from a building.

SUMMARY OF THE INVENTION

The present invention is a rain water downspout for shooting water away from a building. It includes a vertical downspout column for receiving and holding rainwater. The downspout column has an outlet at its lower end. A buoyant column inside the downspout column rests on the bottom of the downspout column and blocks the downspout column outlet until the downspout column fills with enough water to cause the buoyant column to float. A nozzle is attached to the downspout outlet. The nozzle includes a valve that allows water to pass through the nozzle at a pressure. The nozzle can be oriented to shoot a stream of water away from the building. When the buoyant column inside the downspout rises, water flows out of the downspout column under pressure and opens the valve in the nozzle. The water then passes though the nozzle and shoots away from the building. When the buoyant column descends and blocks the downspout column outlet, pressure in the nozzle falls and the valve in the nozzle closes to shut off the flow of water from the nozzle. A spring may be added to the upper end of the downspout column for engaging the buoyant column and forcing it back down the bottom of the downspout column. The nozzle may be fashioned from a flexible material and may have internal structures that only open under pressure. The nozzle may also have a bent shape that only straightens under sufficient pressure. The nozzle may also have an expanding portion that can fill with water and then expel water with even greater force to clear debris from the system.

BRIEF DESCRIPTION OF THE DRAWINGS

The invention and its many attendant objects and advantages will become better understood upon reading the following detailed description of the preferred embodiment in conjunction with the following drawings, wherein.

DETAILED DESCRIPTION OF THE INVENTION

Figures 1, 1A:
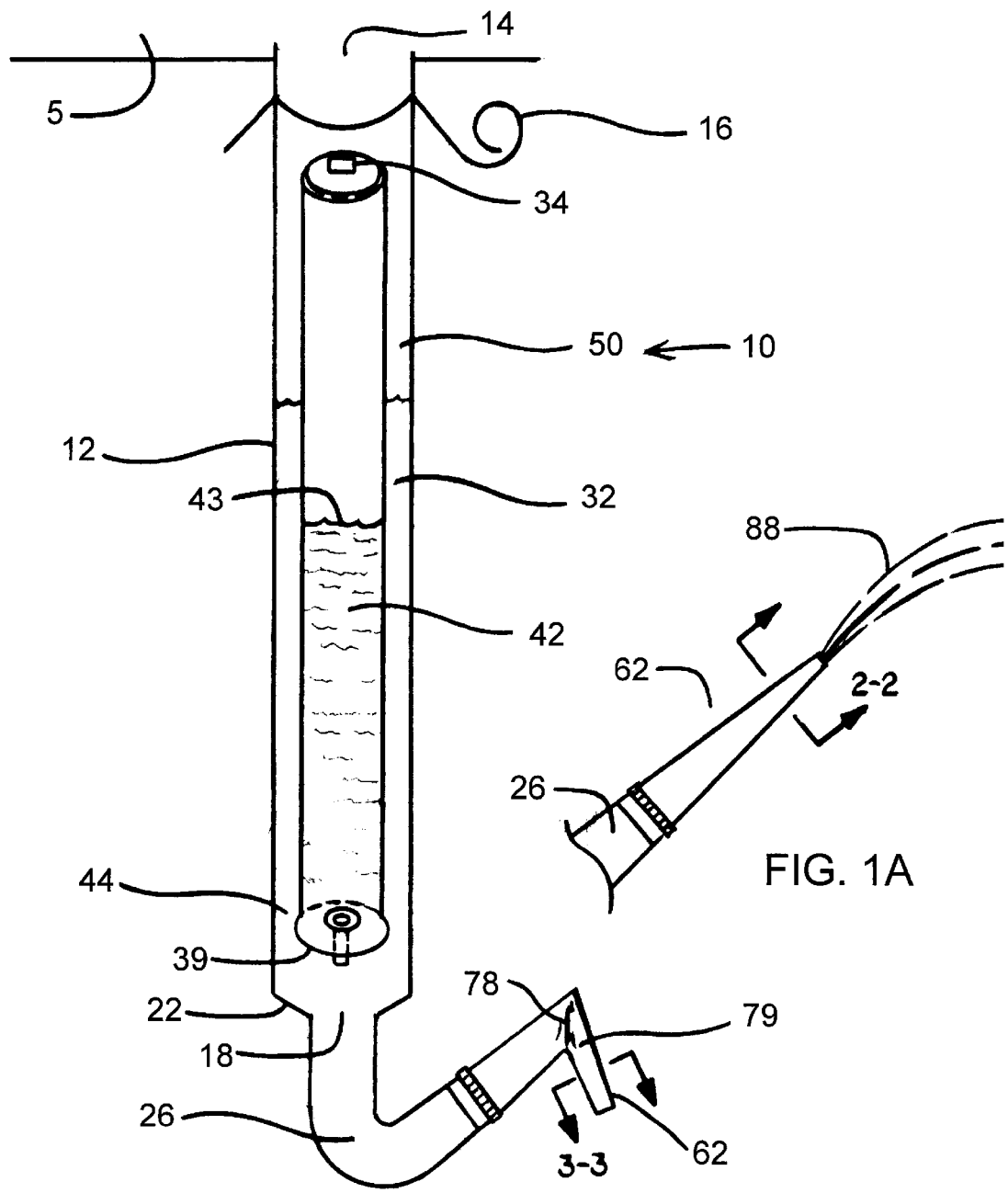
FIG. 1 is a plan view of high pressure downspout with nozzle 62 in a non-pressurized condition.
FIG. 1A is a plan view of high pressure downspout with nozzle 62 in a pressurized condition.
Figure 2:
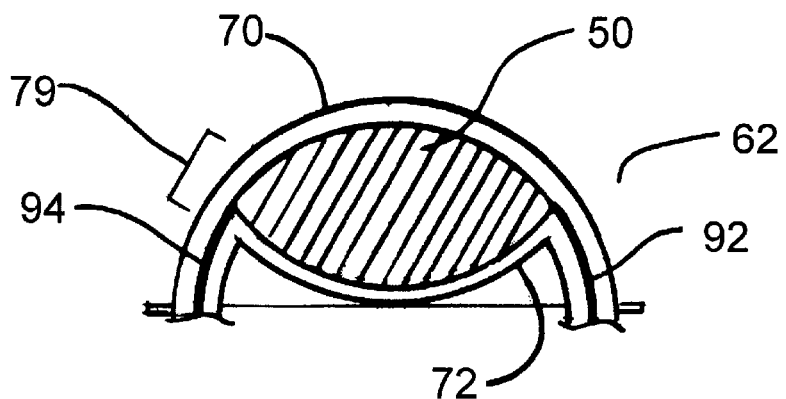
FIG. 2 is a cross sectional view of the nozzle of the high pressure downspout taken from plane 2—2 indicated in FIG. 1A.
Figure 3:
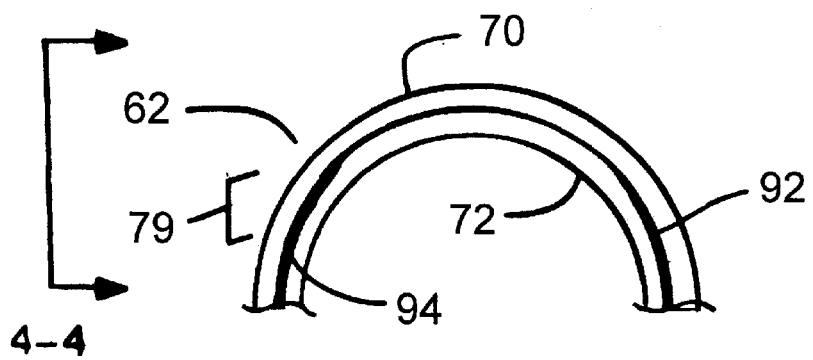
FIG. 3 is a cross sectional view of the nozzle of the high pressure downspout taken from plane 3—3 indicated in FIG. 1.

FIG. 1 illustrates a high pressure downspout 10 comprising a vertical downspout column 12, buoyant column 32 and a nozzle 62. Downspout column 12 is fed by a rain gutter 5 and further includes an inlet 14, a thrust spring 16, an outlet opening 18 and a discharge elbow 26. Buoyant column 32 includes a cap 34, a stopper 39 and a low freezing point aqueous solution 42 filled to an aqueous solution level 43. Stopper 39 is adapted to block outlet opening 18 by seating in stopper seat 22. Stopper 39 is compressed into an oblate spheroid shape and has a flange 44 extending past the edge of buoyant column 32. Nozzle 62 is fixed to discharge elbow 26. In FIG. 1, nozzle 62 is shown in a non-pressurized position and in a pressurized position in FIG. 1A. FIG. 2 is a cross sectional view of nozzle 62 taken from plane 2—2 indicated in FIG. 1 showing nozzle 62 in a pressurized condition. Nozzle 62 is fashioned from an elastic, flexible material such as rubber. FIG. 3 is a cross sectional view of nozzle 62 taken from plane 3-3 indicated in FIG. 1 showing nozzle 62 in a non-pressurized condition. Nozzle 62 includes a primary valve 78 that is closed when nozzle 62 is in a non-pressurized condition of position 64. Nozzle 62 also has a secondary valve 79 which is illustrated in detail in FIG. 2 and FIG. 3.

The level of aqueous solution 42 in buoyant column 32 can be adjusted to change the characteristics of the system. By placing more solution in buoyant column 32, buoyant column 32 will become heavier and therefore cause downspout column 12 to accumulate more water before it is discharged. Conversely, by having less aqueous solution 42 in buoyant column 32, buoyant column 32 will become lighter and therefore will allow downspout column 12 to accumulate less water before discharging. Although, in the preferred embodiment buoyant column 32 contains an aqueous solution, buoyant column 32 may be mostly hollow but weighted to have the same buoyancy as a column partially filled with an aqueous solution.

One problem that is encountered in the use of this system is the accumulation of undischarged water in downspout column 12. Such undischarged water can freeze and cause damage downspout column 12. To combat this problem, buoyant column 32 can be replaced with a column like float whose cross section has flexible walls. The best cross section shape for a buoyant column 32 having flexible walls is an equilateral triangle. When retained water in downspout column 12 freezes, the three flexible walls of a triangular walled buoyant column 32 will deflect to prevent damage to downspout column 12. Of course, even downspout column 12 can be replaced by a conduit having any one of a number of cross section shapes that would have flexible walls capable of elastically yielding to the force of freezing water. Such changes in cross section shape would not change the way in which the invention downspout functions.

Nozzle 62 is an important component of the system because it regulates the pressure at which water is ejected from the system. The function of nozzle 62 is to open and eject water when the water in downspout column 12 reaches a desired pressure. If water is only ejected above a predetermined pressure, then a stream of water leaving nozzle 62 can be directed to a point beyond a predetermined distance away from the building. The preferred embodiment employs a flexible nozzle that extends and opens under pressure as shown in FIG. 1, FIG. 2, FIG. 3 and FIG. 4. However, nozzle 62 as shown in those figures may be replaced by any structure that includes a valve that opens above a predetermined pressure and an outlet that is designed to direct water in a stream having a velocity and a direction.

Figure 4:
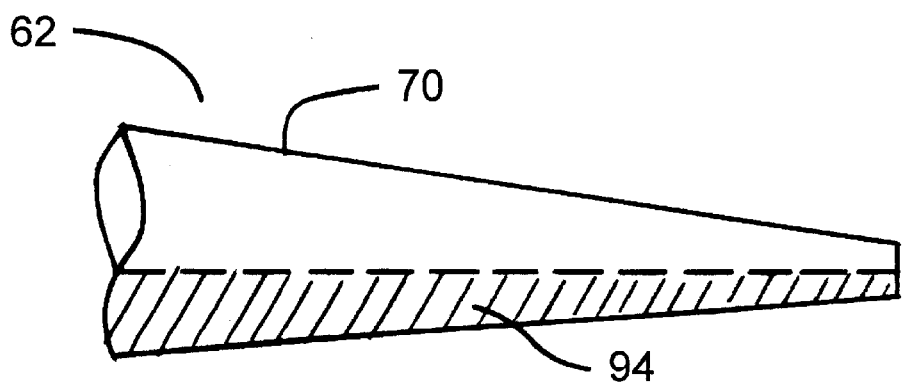
FIG. 4 is a close up side view of the nozzle of the high pressure downspout taken from plane 4—4 indicated in FIG. 3.

In FIG. 2, FIG. 3 and FIG. 4, nozzle 62 is shown to include a first wall 70 and a second wall 72. Nozzle 62 has two positions: the non-pressurized position shown in FIG. 1, and the pressurized position shown in FIG. 1A. When in the non-pressurized position, very little back pressure is present in the system. As pressure is increased, flexible nozzle 62, extends into the pressurized position shown in FIG. 1A. Along the length of nozzle 62, is a second flexible structure that responds to changes in pressure. As can be seen in FIG. 2 and FIG. 3, nozzle 62 includes second wall 72, made from a flexible, elastic material, that usually adheres to first wall 70 in a closed position. Second wall 72 is bonded to first wall 70 at bond joints 92 and 94. When sufficient pressure exists in the water 50 in nozzle 62, second wall 72 is forced away from first wall 70 to define an opening through which water 50 may pass. When the pressure of water 50 in nozzle 62 falls below the sufficient pressure, second wall 72 will return to its resting position in continuous contact with first wall 70. Accordingly, nozzle 62 responds to increasing pressure by opening as it straightens.

Nozzle 62 may be fashioned to assume any one of a number of decorative shapes. Whimsical shapes can be selected such as an animal head. For example, nozzle 62 can be shaped and decorated in the likeness of a cobra snake head. Nozzle 62 can be made to be adjustable so that it can be pointed in any direction over a range of angles of elevation.

Thrust spring 16 positioned at the top of downspout column 12 provides an upper bound for the movement of buoyant column 32 and also provides a way to significantly increase the pressure of the system for a short period of time. Because buoyant column 32 has inertia, it accelerates as it is acted upon by the buoyant force water 50 until cap 34 strikes thrust spring 16. When cap 34 strikes spring 16, it suddenly reverses direction and exerts a momentary force upon the water column below stopper 39. This increases the pressure of water in nozzle 62. Such a momentary increase in pressure is useful because debris can enter a downspout and obstruct the passage of water. A momentary increase in pressure can cause small debris to be forced out of nozzle 62. Large debris may permanently obstruct the system, so it is preferred that the system of collecting troughs that feed downspout 10 be designed to exclude debris that would be large enough to obstruct nozzle 62. Thrust spring 16 may be replaced by any resilient element that would absorb energy from buoyant column 32 and react by applying a downward force upon buoyant column 32.

Downspout 10 operates in cycles. Rainwater from rain gutter 5 enters downspout 12 through inlet 14. Stopper 39 of buoyant column 32 is firmly seated against stopper seat 22 by the weight of buoyant column 32. After water rises above flange 44 of stopper 39, buoyant column 32 begins to be acted upon by an increasing upward buoyant force as the water level in downspout 12 rises. Although water in downspout column 12 exerts pressure on the upper surfaces of stopper flange 44, water begins to seep around stopper 39 as the water in downspout column 12 rises allowing the pressure in nozzle 62 and elbow 26 to partially equalize with the pressure of the water in downspout column 12. Once the level of water 50 in downspout column 12 rises past aqueous solution level 43 of buoyant column 32, the upward buoyant force acting upon buoyant column 32 increases as water continues to leak around stopper 39 to continuing pressurizing the water in elbow 26 and nozzle 62. Eventually, the buoyant force acting on buoyant column 32 causes buoyant column 32 to rise as stopper 39 disengages from stopper seat 22. This allows the water in nozzle 62 and elbow 26 to reach full pressure. In response to these upward buoyant forces in the sudden absence of downward hydrostatic forces that had been pushing down upon stopper flange 44, buoyant column 32 accelerates up and bounces off of spring 16. As buoyant column 32 is thrusting toward spring 16 the hydrostatic pressure in nozzle 62 increases towards a maximum level. This causes nozzle 62 to extend into the open position shown in FIG. 1A opening primary valve 78 and then secondary valve 79. As water is discharging from nozzle 62, buoyant column 32 bounces off of spring 16 and moves downwardly applying pressure to the water column in downspout column 12 directly above elbow 26. This causes water under buoyant column 32 to reach a relatively high pressure for only a very short period of time. During this very short period of time when water under buoyant column 32 is at a relatively high pressure, nozzle 62 expands rapidly and then rapidly contracts as the pressure in the system under buoyant column 32 falls. This high pressure coupled with nozzle expansion dislodges any small debris that may be obstructing the nozzle. When enough water has been exhausted from downspout 10, buoyant column 32 will reseal at the bottom of downspout column 12 to begin another cycle. With a decrease in hydrostatic pressure in nozzle 62, secondary valve 79 closes and primary valve 78 closes as the nozzle returns to the position shown in FIG. 1.

Because the invention downspout discharges water at a high velocity, the invention downspout clears debris from its system. Because water is discharged at a relatively constant velocity and pressure, a stream of water 88 as shown in FIG. 1 can be aimed to strike a relatively small area at a distance away from the foundation of the building.

High pressure downspout 10 may be reconfigured by replacing nozzle 62 with a simple nozzle that is normally open. Such an alternate downspout design will tend to discharge water very slowly and with little force when small amounts of water are entering downspout column 12. However, the constantly open nozzle configuration will forcefully discharge large volumes of water a significant distance when large volumes of water are entering downspout column 12 so that the desired result of conveying rain water away from a structure is achieved when it is most needed. The advantage of a pressure activated valve design is that water is always ejected forcefully at all flow rates. The energy of this water stream is not only useful for conveying water but is also useful for such purposes as forcing water through filtration systems so that collected water may be purified.

The invention has been described above in considerable detail in order to comply with the patent laws by providing a full public disclosure of at least one of its embodiments. However, such a detailed description is not intended in any way to limit the broad features or principles of the invention, or the scope of patent monopoly to be granted. The skilled reader, in view of this specification may envision numerous modifications and variations of the above disclosed preferred embodiment. Accordingly, the reader should understand that these modifications and variations, and the equivalents thereof, are within the spirit and scope of this invention as defined in the following claims, wherein:

I claim:

1. A rain water downspout for collecting water from an eaves trough mounted to a building and shooting the water away from the building, comprising:

(a) a vertical downspout column for receiving and holding rainwater, the downspout column having an inlet at its upper end for receiving rain water flowing from the eaves trough and an outlet at its lower end for releasing rainwater, the outlet having an outlet opening that is smaller in size than the inside diameter of the downspout column, (b) a buoyant column inside the downspout column having a lower end that can block the outlet opening of the downspout column, the buoyant column capable of floating in the downspout column when water in the downspout column reaches a level, (c) a nozzle connected to the downspout outlet, the nozzle having an inlet and a discharge opening, (d) a resilient element disposed toward the top of the downspout column, the resilient element for receiving and absorbing the energy of the buoyant column when it ascends to the top of the downspout column and for applying a force to the top of the buoyant column to force it back down into the downspout column to increase the pressure of the water entering the nozzle inlet for a short period of time, (e) the downspout column adapted to fill with water to a sufficient level to cause the buoyant column to rise to permit a flow of water to pass through the downspout column outlet and into the nozzle to be discharged through the discharge opening of the nozzle and shoot away from the building until the buoyant column descends and blocks the downspout column outlet.

2. The rain water downspout of claim one, wherein, the nozzle further includes a valve that allows water to pass through the nozzle and shoot out through the discharge opening of the nozzle only when water entering the nozzle is at or above a pressure.

3. The rain water downspout of claim one, wherein, a stopper seat surrounds the outlet opening at the lower end of the downspout column and the buoyant column further includes a stopper that protrudes radially around the lower end of the buoyant column, the stopper shaped to sit upon the stopper seat so that water inside the downspout column that surrounds the buoyant column can exert hydrostatic pressure upon the stopper to apply a downward force upon the buoyant column.

4. The rain water downspout of claim one, wherein, a stopper seat surrounds the outlet opening at the lower end of the downspout column and the buoyant column further includes a stopper that protrudes radially around the lower end of the buoyant column, the stopper shaped to sit upon the stopper seat so that water inside the downspout column that surrounds the buoyant column can exert hydrostatic pressure upon the stopper to apply a downward force upon the buoyant column and wherein, the nozzle further includes a valve that allows water to pass through the nozzle and shoot out through the discharge opening of the nozzle only when water entering the nozzle is at or above a pressure.

5. The rain water downspout of claim one, wherein, the buoyant column is partially filled with an aqueous solution having a freezing temperature substantially below the freezing temperature of water.

6. The rain water downspout of claim one, wherein, the nozzle further includes a valve having a passage defined by a first curved wall and a second flexible curved wall that fits against the first curved wall to prevent the passage of water at low pressure, the second flexible curved wall adapted to open into an opposite curved shape away from the first curved wall when water entering the inlet end of the valve has a pressure that is above a predetermined pressure thereby opening a passage for the flow of water through the valve.

7. The rain water downspout of claim one, wherein, the buoyant column has a cross section in the shape of a polygon having at least three sides and the walls of the buoyant column are made from a flexible material capable of deflecting, so that when water that fills the space between buoyant column and the down spout column freezes, the walls of the buoyant column deflect inwardly to prevent damage to the rain water downspout.

8. A rain water downspout for collecting water from an eaves trough mounted to a building and shooting the water away from the building, comprising:

(a) a vertical downspout column for receiving and holding rainwater, the downspout column having an inlet at its upper end for receiving rain water and an outlet at its lower end for releasing rainwater, the outlet having an outlet opening that is smaller in size than the inside diameter of the downspout column, the downspout column also including a stopper seat that surrounds the outlet opening at the lower end of the downspout column, (b) a buoyant column inside the downspout column having a lower end that can block the outlet opening of the downspout column and a stopper shaped to sit upon the stopper seat of the downspout column so that water inside the downspout column that surrounds the buoyant column can exert hydrostatic pressure upon the stopper to apply a downward force upon the buoyant column, the buoyant column capable of floating in the downspout column when water in the downspout column reaches a level, (c) a nozzle connected to the downspout outlet, the nozzle having an inlet end, a valve and a discharge opening, the valve for allowing water to pass through the nozzle and shoot out through the discharge opening of the nozzle only when water entering the nozzle is at or above a pressure, (d) a resilient element disposed toward the top of the downspout column, the resilient element for receiving and absorbing the energy of the buoyant column when it ascends to the top of the downspout column and for applying a force to the top of the buoyant column to force it back down into the downspout column to increase the pressure of the water entering the nozzle inlet for a short period of time, (e) the downspout column adapted to fill with water to a sufficient level to cause the buoyant column to rise to permit a flow of water to pass through the downspout column outlet and into the nozzle to be discharged through the discharge opening of the nozzle and shoot away from the building until the buoyant column descends and blocks the downspout column outlet.

9. The rain water downspout of claim 8, wherein, the valve of the nozzle includes a passage defined by a first wall and a second flexible wall that closes against the first wall to prevent the passage of water at low pressure and that deflects away from the first wall to open the passage for the flow of rain water through the valve when rain water entering the inlet end of the valve has a pressure that is above a predetermined pressure.

10. The rain water downspout of claim 8, wherein, the buoyant column is partially filled with an aqueous solution having a freezing temperature substantially below the freezing temperature of water.

11. The rain water downspout of claim 8, wherein, the buoyant column has a cross section in the shape of a polygon having at least three sides and the walls of the buoyant column are made from a flexible material capable of deflecting, so that when water that fills the space between buoyant column and the down spout column freezes, the walls of the buoyant column deflect inwardly to prevent damage to the rain water downspout.

12. The rain water downspout of claim 8, wherein, the valve of the nozzle includes a passage defined by a first curved wall and a second flexible curved wall that fits against the first curved wall to prevent the passage of water at low pressure, the second flexible curved wall adapted to open into an opposite curved shape away from the first curved wall when water entering the inlet end of the valve has a pressure that is above a predetermined pressure thereby opening a passage for the flow of water through the valve.

* * * * *